(12) United States Patent
Li et al.

(10) Patent No.: US 12,487,488 B2
(45) Date of Patent: Dec. 2, 2025

(54) BACKLIGHT MODULE AND DISPLAY DEVICE INCLUDING THE SAME

(71) Applicant: WUHAN CHINA STAR OPTOELECTRONICS TECHNOLOGY CO., LTD., Hubei (CN)

(72) Inventors: Fu Li, Hubei (CN); Yan Cheng, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 18/247,635

(22) PCT Filed: Mar. 24, 2023

(86) PCT No.: PCT/CN2023/083896
§ 371 (c)(1),
(2) Date: Jan. 14, 2025

(87) PCT Pub. No.: WO2024/178762
PCT Pub. Date: Sep. 6, 2024

(65) Prior Publication Data
US 2025/0143059 A1    May 1, 2025

(30) Foreign Application Priority Data

Feb. 28, 2023  (CN) .......................... 202310188115.7

(51) Int. Cl.
*G02F 1/13357*  (2006.01)
*G02F 1/1335*  (2006.01)
(Continued)

(52) U.S. Cl.
CPC .. *G02F 1/133603* (2013.01); *G02F 1/133607* (2021.01); *H10H 29/24* (2025.01); *H10H 29/855* (2025.01)

(58) Field of Classification Search
CPC ......... G02F 1/133603; G02F 1/133606; G02F 1/133607; G02F 1/133605; H01H 29/24;
(Continued)

(56) References Cited

U.S. PATENT DOCUMENTS

2007/0051960 A1   3/2007  Yu
2012/0081882 A1*  4/2012  Im .................... G02F 1/133603
                                                      362/97.1
(Continued)

FOREIGN PATENT DOCUMENTS

CN       1928651 A        3/2007
CN     104407474 A  *     3/2015    ....... G02F 1/133606
(Continued)

OTHER PUBLICATIONS

International Search Report in International application No. PCT/CN2023/083896, mailed on Nov. 5, 2023.
(Continued)

*Primary Examiner* — Alexander K Garlen
(74) *Attorney, Agent, or Firm* — PV IP PC; Christopher S. Ruprecht; Wei Te Chung

(57) ABSTRACT

The disclosure discloses a backlight module and a display device including the same. The backlight module includes a substrate, a light source assembly disposed on the substrate and including a plurality of light-emitting chips disposed at intervals, and a light guide plate disposed on the light source assembly. A surface of the light guide plate facing the substrate is provided with a plurality of grooves where one of the light-emitting chips is correspondingly disposed in one of the grooves, a bottom of each of the grooves is
(Continued)

provided with a plurality of first concave parts disposed at intervals, and each of the first concave parts is defined with an arc surface recessed towards a direction away from the substrate.

14 Claims, 3 Drawing Sheets

(51) Int. Cl.
*H10H 29/24* (2025.01)
*H10H 29/855* (2025.01)

(58) Field of Classification Search
CPC . H01H 29/855; H01H 29/856; F21Y 2105/16
See application file for complete search history.

(56) References Cited

U.S. PATENT DOCUMENTS

| | | | | |
|---|---|---|---|---|
| 2018/0335559 | A1* | 11/2018 | Cho | G02B 6/0091 |
| 2020/0049876 | A1* | 2/2020 | Watanabe | G02F 1/133603 |
| 2021/0041617 | A1* | 2/2021 | Watanabe | G02F 1/0107 |
| 2023/0314871 | A1* | 10/2023 | Xie | G02B 6/0021 |
| | | | | 362/97.1 |

FOREIGN PATENT DOCUMENTS

| | | | | |
|---|---|---|---|---|
| CN | 107656398 A | | 2/2018 | |
| CN | 211603793 U | | 9/2020 | |
| CN | 114779386 A | * | 7/2022 | G02F 1/133603 |
| CN | 114895493 A | | 8/2022 | |
| CN | 114967233 A | | 8/2022 | |
| WO | WO-2010113361 A1 | * | 10/2010 | H10H 20/882 |

OTHER PUBLICATIONS

Written Opinion of the International Search Authority in International application No. PCT/CN2023/083896, mailed on Nov. 5, 2023.

* cited by examiner

BACKLIGHT MODULE AND DISPLAY DEVICE INCLUDING THE SAME

CROSS REFERENCE TO RELATED APPLICATIONS

This application is a national stage of International Application No. PCT/CN2023/083896 filed on Mar. 24, 2023, which claims priority to and the benefit of Chinese Patent Application No. 202310188115.7 filed on Feb. 28, 2023, the applications of which are incorporated herein by reference in their entirety.

TECHNICAL FIELD

The disclosure relates to the technical field of display, in particular to a backlight module and a display device including the same.

BACKGROUND

Mini light-emitting diode (Mini-LED) technology has great potential to become one of development directions in next generation of display technologies. Display effects of low temperature polysilicon-liquid crystal display panels equipped with Mini-LED backlight modules in dark states have been significantly improved compared with a display effect of organic light-emitting display panels. Although thicknesses need to be reduced and response time needs to be improved, the liquid crystal display panels equipped with the Mini-LED backlight modules have obvious advantages in power consumption, high dynamic range (HDR) standard, contrast, brightness, and product reliability.

However, in the prior art, a light-splitting structure containing multi-layers stacked in sequence are generally designed in the Mini-LED backlight modules to achieve better brightness uniformity. On one hand, the above-mentioned design causes a problem of high manufacturing cost, and on another hand, it leads to a problem of low brightness caused by light loss.

SUMMARY

Embodiments of the disclosure provides a backlight module and a display device including the same to solve problems of low brightness and high manufacturing cost.

To solve the above-mentioned problems, technical solutions provided by the disclosure are as following.

An embodiment of the disclosure provides a backlight module, including:
a substrate;
a light source assembly disposed on the substrate and including a plurality of light-emitting chips disposed at intervals; and
a light guide plate disposed on the light source assembly; wherein a surface of the light guide plate facing the substrate is provided with a plurality of grooves where one of the light-emitting chips is correspondingly disposed in one of the grooves; a bottom of each of the grooves is provided with a plurality of first concave parts disposed at intervals, and each of the first concave parts is defined with an arc surface recessed towards a direction away from the substrate.

In some embodiments of the disclosure, a side wall of each of the grooves is provided with a plurality of second concave parts disposed at intervals, and each of the second concave parts is defined with an arc surface recessed towards a direction away from a corresponding one of the light-emitting chips.

In some embodiments of the disclosure, a distribution density of the first concave parts is greater than a distribution density of the second concave parts.

In some embodiments of the disclosure, a curvature of the arc surface of each of the first concave parts is greater than a curvature of the arc surface of each of the second concave parts.

In some embodiments of the disclosure, in an arrangement direction of the plurality of first concave parts, a length of an orthographic projection of each of the first concave parts on the substrate ranges from 5 μm to 50 μm, and a pitch between two adjacent ones of the first concave parts ranges from 5 μm to 500 μm.

In some embodiments of the disclosure, a reflective layer is disposed between the substrate and the light guide plate between adjacent light-emitting chips.

In some embodiments of the disclosure, a surface of the light guide plate opposite to the reflective layer is provided with a plurality of protrusion parts, and each of the protrusion parts is defined with an arc surface protruded towards a direction facing the substrate.

In some embodiments of the disclosure, the backlight module is defined with a first light-emitting area and a second light-emitting area located between the first light-emitting area and an edge of the substrate, and a distribution density of the protrusion parts at the first light-emitting area is less than a distribution density of the protrusion parts at the second light-emitting area.

In some embodiments of the disclosure, a surface of the light guide plate away from the substrate is provided with a micro-prism structure.

In some embodiments of the disclosure, a side of the light guide plate away from the substrate is provided with a plurality of astigmatic films disposed at intervals, and one of the astigmatic films is disposed corresponding to one of the light-emitting chips.

In some embodiments of the disclosure, a surface of each of the astigmatic films away from the substrate is provided with a plurality of third concave parts, and each of the third concave parts is defined with an arc surface recessed towards a direction facing the substrate.

In some embodiments of the disclosure, an orthographic projection of one of the astigmatic films on the substrate covers an orthographic projection of a corresponding one of the light-emitting chips on the substrate, and a ratio of an area of the orthographic projection of the one of the astigmatic films on the substrate to an area of the orthographic projection of the corresponding one of the light-emitting chips on the substrate ranges from 1 to 2.

In some embodiments of the disclosure, the backlight module further includes a light-splitting film disposed on a side of the astigmatic films away from the substrate and a brightening film disposed on the light-splitting film.

An embodiment of the disclosure further provides a display device, the display device includes a display panel and the above-mentioned backlight module, and the display panel is disposed on a light-emitting surface of the backlight module.

In some embodiments of the disclosure, a side wall of each of the grooves is provided with a plurality of second concave parts disposed at intervals, and each of the second concave parts is defined with an arc surface recessed towards a direction away from a corresponding one of the light-emitting chips.

In some embodiments of the disclosure, a distribution density of the first concave parts is greater than a distribution density of the second concave parts.

In some embodiments of the disclosure, a curvature of the arc surface of each of the first concave parts is greater than a curvature of the arc surface of each of the second concave parts.

In some embodiments of the disclosure, in an arrangement direction of the plurality of first concave parts, a length of an orthographic projection of each of the first concave parts on the substrate ranges from 5 μm to 50 μm, and a pitch between two adjacent first concave parts ranges from 5 μm to 500 μm.

In some embodiments of the disclosure, a reflective layer is disposed between the substrate and the light guide plate between adjacent light-emitting chips.

In some embodiments of the disclosure, a surface of the light guide plate opposite to the reflective layer is provided with a plurality of protrusion parts, and each of the protrusion parts is defined with an arc surface protruded towards a direction facing the substrate.

Embodiments of the disclosure provides the backlight module and the display panel including the same. The backlight module includes the substrate, the light source assembly disposed on the substrate and including the plurality of light-emitting chips disposed at intervals, and the light guide plate disposed on the light source assembly. The surface of the light guide plate facing the substrate is provided with the plurality of grooves, at least the part of one of the light-emitting chips is correspondingly disposed in one of the grooves, the bottom of each of the grooves is provided with the plurality of first concave parts disposed at intervals, and each of the first concave parts is defined with the arc surface recessed towards the direction away from the substrate. By designing the first concave parts disposed at intervals on the bottom of the groove, when light emitted from a top surface of the light-emitting chip reaches the arc surface of the first concave part, since the arc surface of the first concave part is an interface surface of light emitted from an optical-sparse medium of air to an optical-dense medium of the light guide plate, light passing through the arc surface of the first concave part will refract and diffuse, so that light emitted from the top surface of the light-emitting chip can be diffused to areas between two adjacent light-emitting chips, so as to improve brightness uniformity of the backlight module. That is, by designing the first concave parts on the light guide plate, a light-splitting effect can be achieved without adding additional light-splitting films, thus reducing manufacturing cost of the backlight module, and at a same time, light loss can be greatly reduced to improve brightness of the backlight module.

DETAILED DESCRIPTION OF EMBODIMENT

The following will give a clear and complete description of technical solutions in embodiments of the disclosure in combination with drawings in the embodiments of the disclosure. Obviously, the described embodiments are only part of the embodiments of the disclosure, not all of them. Based on the embodiments in the disclosure, all other embodiments obtained by those skilled in the art without creative work fall within a scope of protection in the disclosure.

In the description of the disclosure, it should be understood that orientational or positional relationships indicated by terms "center", "longitudinal", "transverse", "length", "width", "thickness", "up", "down", "front", "back", "left", "right", "vertical", "horizontal", "top", "bottom", "inside", "outside", etc. are based on orientational or positional relationships shown in the attached drawings, which is only for convenience of describing the disclosure and simplifying the description, but not to indicate or imply that devices or elements referred to must have a specific orientation, be constructed and operated in a specific orientation, and therefore cannot be understood as a limitation of the disclosure. In addition, terms "first" and "second" are only used for describing purposes, and cannot be understood as indicating or implying relative importance or implying numbers of technical features indicated. Therefore, the features defined as "first" and "second" can explicitly or implicitly include one or more of the above-mentioned features. In the description of the disclosure, "a plurality of" means two or more than two, unless otherwise specified.

In the disclosure, a word "exemplary" is used to indicate "used as an example or illustration". Any embodiment described as "exemplary" in the disclosure is not necessarily interpreted as more preferred or advantageous than other embodiments. In order to enable any person skilled in the art to realize and use the disclosure, the following description is provided. In the following description, details are listed for a purpose of explanation. It should be understood that those skilled in the art can realize that the disclosure can be realized without using these specific details. In other examples, well-known structures and processes will not be described in detail to avoid unnecessary details that make the description of the disclosure obscure. Therefore, the disclosure is not intended to be limited to the embodiments shown, but is consistent with a widest range of principles and features disclosed in the disclosure.

Figure 1:
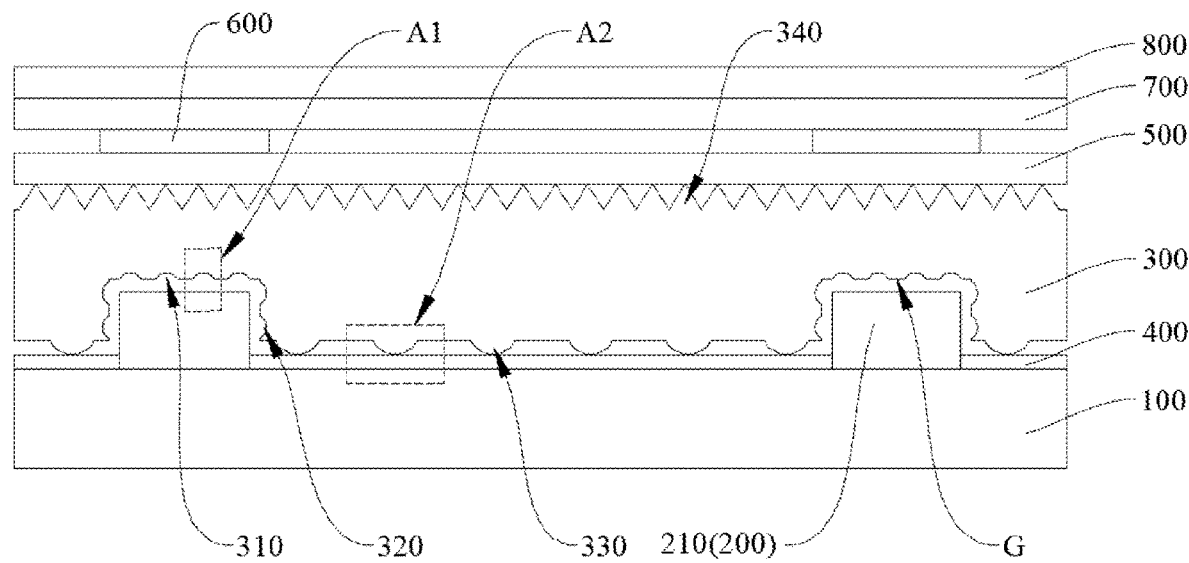
FIG. 1 is a schematic sectional structural diagram of a backlight module provided by an embodiment of the disclosure.

Referring to FIG. 1, an embodiment of the disclosure provides a backlight module, and the backlight module includes a substrate 100, and a light source assembly 200 and a light guide plate 300 disposed on the substrate 100 in sequence.

The substrate 100 is a flexible printed circuit or a printed circuit board. The light source assembly 200 includes a plurality of light-emitting chips 210 disposed at intervals. The light-emitting chips 210 are electrically connected to the substrate 100. The light-emitting chip 210 is a five-sided light-emitting chip, specifically a five-sided light-emitting diode. The light guide plate 300 is disposed on the light source assembly 200 and configured to receive light emitted from the light-emitting chip 210 and then guide the light. A material of the light guide plate 300 is polycarbonate, acrylic, or other conventional materials in the art.

A surface of the light guide plate 300 facing the substrate 100 is provided with a plurality of grooves G. The light-emitting chip 210 is correspondingly disposed in the groove G. A bottom of the groove G is provided with a plurality of first concave parts 310 disposed at intervals. The first concave part 310 is defined with an arc surface recessed towards a direction away from the substrate 100.

In the backlight module provided by the embodiment of the disclosure, the light-emitting chip 210 is disposed in the groove G defined in the light guide plate 300. That is, a side wall and the bottom of the groove G are used as light incident surfaces of the corresponding light-emitting chip 210. Light emitted from the light-emitting chip 210 in all directions enters the light guide plate 300 by passing through the side wall and the bottom of the groove G, transmits in the light guide plate 300, and finally emits from a light-emitting surface of the light guide plate 300. The light-emitting surface of the light guide plate 300 is a surface of the light guide plate 300 away from the substrate 100.

Figure 2:
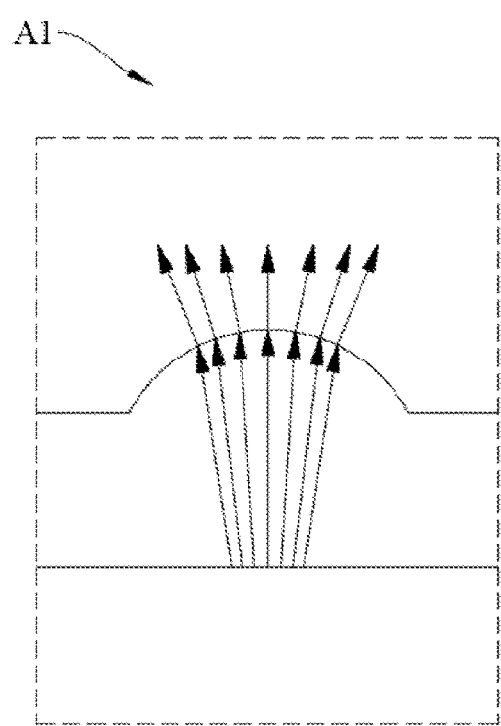
FIG. 2 is a schematic enlarged structural diagram at an area of A1 in FIG. 1.

Further, referring to FIG. 1 and FIG. 2, by designing the plurality of first concave parts 310 disposed at intervals on the bottom of the groove G, when light emitted from a top surface of the light-emitting chip 210 reaches the arc surface of the first concave part 310, since the arc surface of the first concave part 310 is an interface surface of light emitted from an optical-sparse medium of air to an optical-dense medium of the light guide plate, light passing through the arc surface of the first concave part 310 will refract and diffuse, so that light emitted from the top surface of the light-emitting chip 210 can be diffused to areas between two adjacent light-emitting chips 210, so as to improve brightness uniformity of the backlight module. That is, by designing the first concave parts 310 on the light guide plate 300, a light-splitting effect can be achieved without adding additional light-splitting films, thus reducing manufacturing cost of the backlight module, and at a same time, light loss can be greatly reduced to improve brightness of the backlight module.

In some embodiments, the side wall of the groove G is provided with a plurality of second concave parts 320 disposed at intervals. The second concave part 320 is defined with an arc surface recessed towards a direction away from the corresponding light-emitting chip 210. Further, by disposing the plurality of second concave parts 320 disposed at intervals on the side wall of the groove G, when light emitted from a side surface of the light-emitting chip 210 reaches the arc surface of the second concave part 320, since the arc surface of the second concave part 320 is an interface surface of light emitted from the optical-sparse medium of air to the optical-dense medium of the light guide plate, light passing through the arc surface of the second concave part 320 will refract and diffuse, so that light emitted from the side surface of the light-emitting chip 210 can be more evenly diffused between adjacent light-emitting chips 210, thus achieving light atomization to further improve the brightness uniformity of the backlight module.

In some embodiments, based on actual requirements of light atomization, light emitted from the top surface of the light-emitting chip 210 needs higher degree of light atomization than light emitted from the side surface of the light-emitting chip 210. Therefore, a distribution density of the first concave parts 310 can be designed to be greater than a distribution density of the second concave parts 320. In this way, more light emitted from the top surface of the light-emitting chip 210 can enter the first concave part 310, refract and diffuse in the first concave part 310, and enters the light guide plate 300. A value of the distribution density of the first concave parts 310 and a value of the distribution density of the second concave parts 320 can be designed according to actual light-emitting angles of the light-emitting chip 210.

In some embodiments, based on actual requirements of light atomization, light emitted from the top surface of the light-emitting chip 210 needs higher degree of light atomization than light emitted from the side surface of the light-emitting chip 210. Therefore, a curvature of the arc surface of the first concave part 310 is designed to be greater than a curvature of the arc surface of the second concave part 320. In this way, light emitted from the top surface of the light-emitting chip 210 can refract and diffuse at a greater angle when passing through the first concave part 310, and then enter the light guide plate 300. A value of the curvature of the arc surface of the first concave part 310 and a value of the curvature of the arc surface of the second concave part 320 can be designed according to actual light-emitting angles of the light-emitting chip 210.

In some embodiments, a size of the first concave part 310 ranges from 5 μm to 50 μm, and a pitch between two adjacent first concave parts 310 ranges from 5 μm to 500 μm. The size of the first concave part 310 is defined as a length of an orthographic projection of the first concave part 310 on the substrate 100 in an arrangement direction of the plurality of first concave parts 310. The pitch between two adjacent first concave parts 310 is generally disposed to be greater than the size of the first concave part 310. Further, the size of the first concave part 310 and the pitch between two adjacent first concave parts 310 can be designed according to actual light-emitting angles of the light-emitting chip 210.

In some embodiments, a size of the second concave part 320 ranges from 5 μm to 50 μm. The size of the second concave part 320 is defined as a length of an orthographic projection of the second concave part 320 on the substrate 100 in an arrangement direction of the plurality of second concave parts 320. A pitch between two adjacent second concave parts 320 ranges from 5 μm to 500 μm, and the between two adjacent second concave parts 320 is generally disposed to be greater than the size of the second concave part 320. Further, the size of the second concave part 320 and the pitch between two adjacent second concave parts 320 can be designed according to actual light-emitting angles of the light-emitting chip 210.

To sum up, on a basis of actual light-emitting angles of the light-emitting chip 210, an optimum effect of light atomization can be obtained by comprehensively adjusting the size of the first concave part 310, the size of the second concave part 320, the curvature of the arc surface of the first concave part 310, the curvature of the arc surface of the second concave part 320, the distribution density of the first concave parts 310, and the distribution density of the second concave parts 320, so as to obtain optimum brightness uniformity of the backlight module.

Referring to FIG. 1, in some embodiments, a reflective layer 400 is disposed between the substrate 100 and the light guide plate 300 between adjacent light-emitting chips 210. The reflective layer 400 is configured to reflect light emitted from a lower side of the light-emitting chip 210 to an upper side of the light-emitting chip 210, so that light reaching the upper side of the light-emitting chip 210 can emit from the light-emitting surface of the light guide plate 300, so as to avoid loss of light emitted from the lower side of the light-emitting chip 210, thereby improving a utilization rate of light emitted from the light-emitting chip 210 to further improve the brightness of the backlight module.

Figure 3:
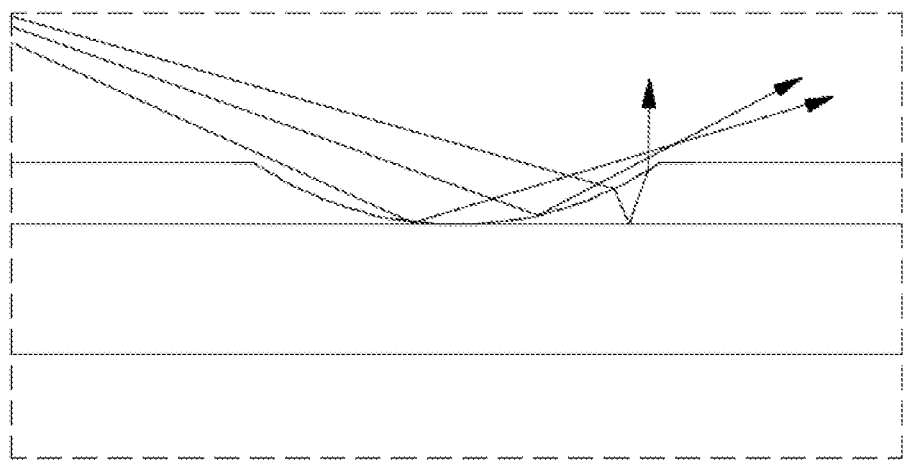
FIG. 3 is a schematic enlarged structural diagram at an area of A2 in FIG. 1.

Referring to FIG. 1, in some embodiments, a surface of the light guide plate 300 opposite to the reflective layer 400 is provided with a plurality of protrusion parts 330 disposed at intervals. The protrusion part 330 is defined with an arc surface recessed towards a direction facing the substrate 100. Please refer to FIG. 1 and FIG. 3, when part of light emitted from the side surface of the light-emitting chip 210 reaches the arc surface of the protrusion part 330, since the arc surface of the protrusion part 330 is an interface surface of light emitted from the optical-dense medium of the light guide plate to the optical-sparse medium of air, the part of the light reflects totally at the interface surface, guides upward, and emits from the light-emitting surface of the light guide plate 300. Another part of the light emitted from the side surface of the light-emitting chip 210 refracts at the interface surface, reaches the reflective layer 400 downward, and reflects back on the protrusion part 330 passing through the reflective layer 400. Since the protrusion part 330 is defined with the arc surface recessed towards the direction facing the substrate 100, light entering the arc surface of the protrusion part 330 reflected from the reflective layer 400 refracts and converges at the interface surface, and emits along a direction perpendicular to the substrate 100, that is, the protrusion part 330 plays a positive light guiding role, thus optimizing light-emitting angles of the backlight module.

Figure 4:
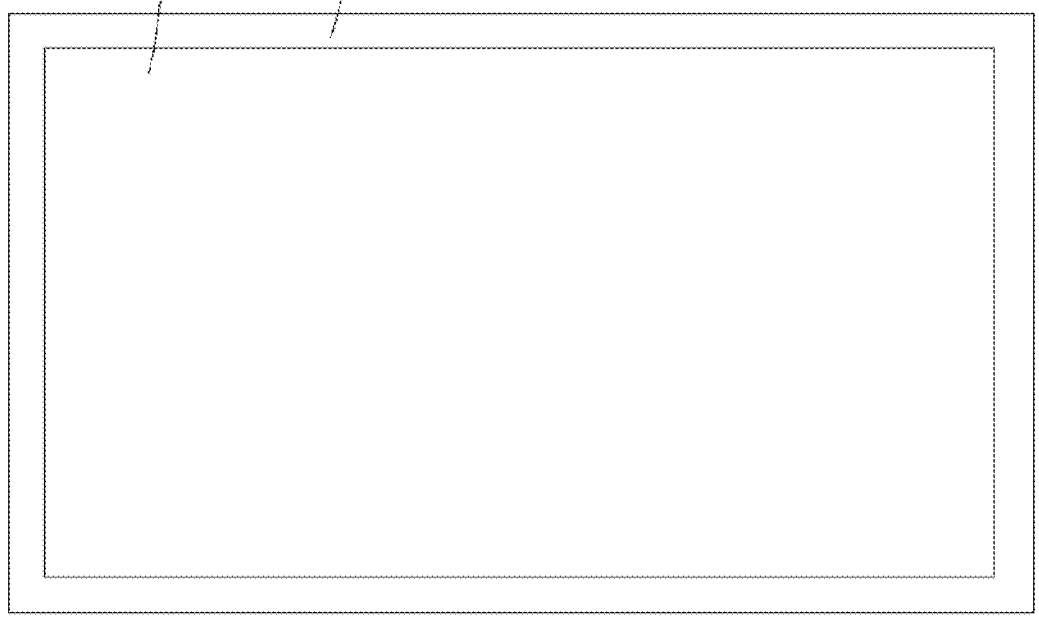
FIG. 4 is a schematic plane structural diagram of the backlight module provided by the embodiment of the disclosure.

Please refer to FIG. 1 and FIG. 4, in some embodiments, the backlight module includes a first light-emitting area L1 and a second light-emitting area L2 located between the first light-emitting area L1 and an edge of the substrate 100. A distribution density of the protrusion parts 330 at the first light-emitting area L1 is less than a distribution density of the protrusion parts 330 at the second light-emitting area L2, that is, the protrusion parts 330 at a peripheral area is designed more densely to guide more light in a forward direction, so as to reduce large-angle light emitted from the peripheral area to a non-effective backlight area, that is, improve an utilization rate of light emitted from the light-emitting chip 210, thereby improving the brightness of the backlight module.

In some embodiments, a size of the protrusion part 330 ranges from 5 μm to 50 μm, and a pitch between two adjacent protrusion parts 330 ranges from 5 μm to 500 μm. The size of the protrusion part 330 is defined as a maximum size of an orthographic projection of the protrusion part 330 on the substrate 100. The pitch between two adjacent protrusion parts 330 is generally designed to be greater than the size of the protrusion part 330. Further, the size of the protrusion part 330 and the pitch between two adjacent protrusion parts 330 can be designed according to actual light-emitting angles of the light-emitting chip 210.

A distribution of the first light-emitting area L1 and the second light-emitting area L2, a distribution density of the protrusion parts 330 at the first light-emitting area L1, and a distribution density of the protrusion parts 330 at the second light-emitting area L2 can be adjusted according to actual light-emitting angles of the light-emitting chip 210, so that the brightness and light-emitting angles of the backlight module can reach an optimum state.

Please refer to FIG. 1, in some embodiments, a surface of the light guide plate 300 away from the substrate 100 is provided with a micro-prism structure 340. That is, the micro-prism structure 340 is disposed on the light-emitting surface of the light guide plate 300 to further guide light forward and optimize light-emitting angles of the backlight module, so as to improve the brightness of the backlight module.

In some embodiments, a cross-sectional shape of the micro-prism structure 340 is triangular (as shown in FIG. 1), trapezoidal, or semicircular.

Please refer to FIG. 1, in some embodiments, a side of the light guide plate 300 away from the substrate 100 is also provided with a plurality of astigmatic films 600 disposed at intervals. The astigmatic film 600 is disposed corresponding to the light-emitting chip 210. The astigmatic film 600 is an optical film capable of emitting light, so that light emitted from the top surface of the light-emitting chip 210 can pass through the astigmatic film 600 and then reach an area between two adjacent light-emitting chips 210, so as to improve the brightness uniformity of the backlight module. The astigmatic film 600 works in cooperation with the first concave part 310 disposed on the groove G to disperse light emitted from the top surface of the light-emitting chip 210 to areas between two adjacent light-emitting chips 210, so as to achieve optimum brightness uniformity of the backlight module.

Figure 5:
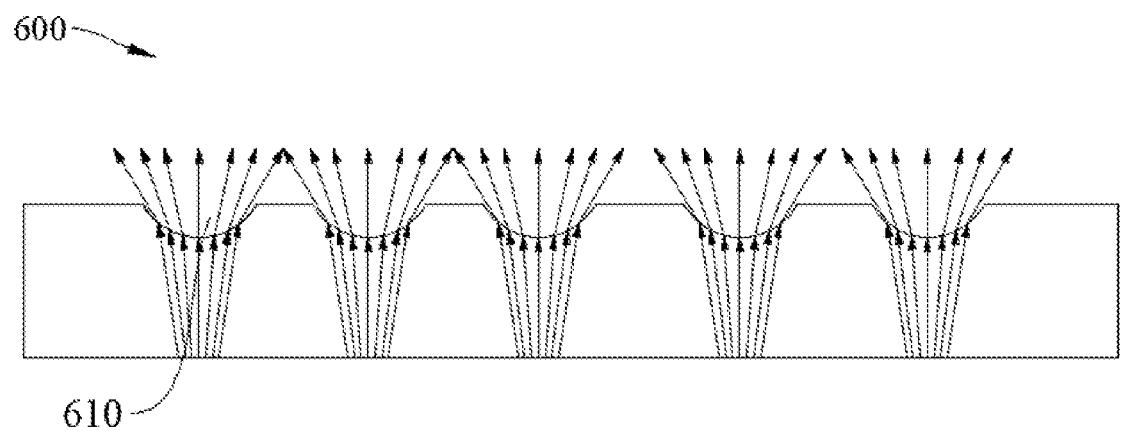
FIG. 5 is a schematic sectional structural diagram of an astigmatic film in the backlight module provided by the embodiment of the disclosure.

Please refer to FIG. 1 and FIG. 5, in some embodiments, a surface of the astigmatic film 600 away from the substrate 100 is provided with a plurality of third concave parts 610 disposed at intervals. The third concave part 610 is provided with an arc surface recessed towards a direction facing the substrate 100. When light emitted from the light guide plate 300 reaches the arc surface of the third concave part 610 of the astigmatic film 600, since the arc surface of the third concave part 610 is an interface surface of light emitted from an optical-dense medium of the astigmatic film to the optical-sparse medium of air, light passing through the arc surface of the third concave part 610 will refract and diffuse.

It can be understood that the size of the third concave part 610, the curvature of the arc surface of the third concave part 610, and the distribution density of the third concave parts 610 can be comprehensively adjusted according to actual angles of light emitted from the light guide plate 300, so as to obtain an optimum effect of light atomization, thus achieving optimum brightness uniformity of the backlight module.

In some embodiments, a material of the astigmatic film 600 may be white ink, and the third concave part 610 defined on the astigmatic film 600 may be formed by a nano-imprinting process.

In some embodiments, an orthographic projection of the astigmatic film 600 on the substrate 100 covers an orthographic projection of the corresponding light-emitting chip 210 on the substrate 100, and a ratio of an area of the orthographic projection of the astigmatic film 600 on the substrate 100 to an area of the orthographic projection area of the corresponding light-emitting chip 210 on the substrate 100 ranges from 1 to 2.

In some embodiments, a center of the orthographic projection of the astigmatic film 600 on the substrate 100 coincides with a center of the orthographic projection of the corresponding light-emitting chip 210 on the substrate 100.

In some embodiments, the backlight module also includes a light-splitting film 700 disposed on a side of the astigmatic film 600 away from the substrate 100 and a brightening film 800 disposed on the light-splitting film 700. The light-splitting film 700 and the brightening film 800 are both full-surface structures. On a basis of a local light atomization effect of the astigmatic film 600, the first concave part 310, and the second concave part 320, the light-splitting film 700 can further play a whole-surface light atomization role to improve the brightness uniformity of the backlight module. Light diffused by the light-splitting film 700 passes through the brightening film 800 and then emits forward, thus optimizing a light-emitting direction of the backlight module to improve the brightness of the backlight module.

In some embodiments, a transparent encapsulating layer 500 is also disposed between the light guide plate 300 and the astigmatic film 600.

Figure 6:
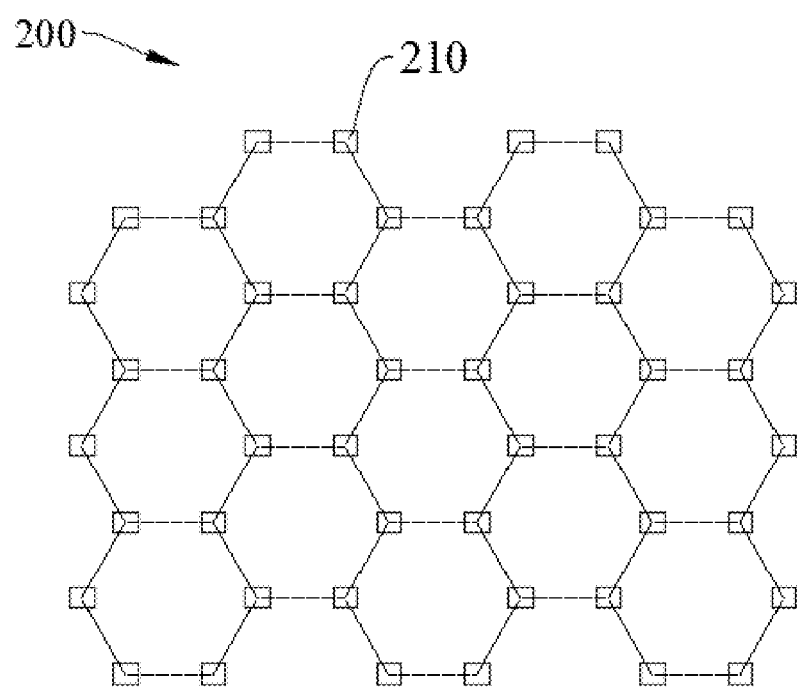
FIG. 6 is a schematic plane structural diagram of a light source assembly in the backlight module provided by the embodiment of the disclosure.

Referring to FIG. 6, in some embodiments, the light-emitting chips 210 are distributed in a cellular lattice, or in other distribution modes according to actual requirements. The embodiment of the disclosure does not make special restrictions on this.

To sum up, in the backlight module provided by the above-mentioned embodiment of the disclosure, by designing the light guide plate 300 with a special structure, a light path of the light-emitting chip 210 can be adjusted by the first concave part 310, the second concave part 320, the protrusion part 330, and the micro-prism structure 340 disposed in the light guide plate 300, so that light emitted from the light guide plate 300 can emit evenly and has a better emitting angle, so that the backlight module has better brightness uniformity and higher brightness.

Further, in combination with the astigmatic film 600, the light-splitting film 700, and the brightening film 800 disposed on the light-emitting surface of the light guide plate 300, the brightness uniformity of the backlight module can be further optimized and the brightness of the backlight module can be further improved.

Through the above-mentioned design, a light-splitting structure containing multi-layers stacked in sequence does not need to be designed in the backlight module, which can reduce manufacturing cost of the backlight module, and is particularly suitable for large-scale industrial production of backlight modules.

It should be noted that the above-mentioned backlight module provided by the embodiments only describes the above-mentioned structure. It can be understood that in addition to the above-mentioned structure, the backlight module provided by the embodiments of the disclosure can also include any other necessary structure according to requirements, and details are not limited here.

A display device is also provided by another embodiment of the disclosure. The display device includes a display panel and the backlight module provided by the above-mentioned embodiment. The display panel is disposed on a light-emitting surface of the backlight module.

The backlight module and the display device including the backlight module provided by the embodiments of the disclosure are described in detail. In this paper, specific embodiments are adopted to illustrate a principle and implementation modes of the disclosure. The description of the above-mentioned embodiments is only used to help understand methods and a core idea of the disclosure. At the same time, for those skilled in the art, of the idea of the disclosure, there will be changes in specific implementation modes and a scope of the disclosure. In conclusion, contents of the specification should not be interpreted as a limitation of the disclosure.

What is claimed is:

1. A backlight module, comprising:
a substrate;
a light source assembly, disposed on the substrate, and comprising a plurality of light-emitting chips disposed at intervals; and
a light guide plate, disposed on the light source assembly;
wherein a surface of the light guide plate facing the substrate is provided with a plurality of grooves where one of the light-emitting chips is correspondingly disposed; a bottom of each of the grooves is provided with a plurality of first concave parts disposed at intervals, and each of the first concave parts is defined with an arc surface recessed towards a direction away from the substrate; a side wall of each of the grooves is provided with a plurality of second concave parts disposed at intervals, and each of the second concave parts is defined with an arc surface recessed towards a direction away from a corresponding one of the light-emitting chips;
wherein a reflective layer is disposed between the substrate and the light guide plate between adjacent light-emitting chips; a surface of the light guide plate opposite to the reflective layer is provided with a plurality of protrusion parts disposed at intervals, and each of the protrusion parts is defined with an arc surface protruded towards a direction facing the substrate.

2. The backlight module of claim 1, wherein a distribution density of the first concave parts is greater than a distribution density of the second concave parts.

3. The backlight module of claim 1, wherein a curvature of the arc surface of each of the first concave parts is greater than a curvature of the arc surface of each of the second concave parts.

4. The backlight module of claim 1, wherein in an arrangement direction of the plurality of first concave parts, a length of an orthographic projection of each of the first concave parts on the substrate ranges from 5 μm to 50 μm, and a pitch between two adjacent ones of the first concave parts ranges from 5 μm to 500 μm.

5. The backlight module of claim 1, wherein the backlight module is defined with a first light-emitting area and a second light-emitting area located between the first light-emitting area and an edge of the substrate, and a distribution density of the protrusion parts at the first light-emitting area is less than a distribution density of the protrusion parts at the second light-emitting area.

6. The backlight module of claim 1, wherein a surface of the light guide plate away from the substrate is provided with a micro-prism structure.

7. The backlight module of claim 1, wherein a side of the light guide plate away from the substrate is provided with a plurality of astigmatic films disposed at intervals, and one of the astigmatic films is disposed corresponding to one of the light-emitting chips.

8. The backlight module of claim 7, wherein a surface of each of the astigmatic films away from the substrate is provided with a plurality of third concave parts, and each of the third concave parts is defined with an arc surface recessed towards a direction facing the substrate.

9. The backlight module of claim 7, wherein an orthographic projection of one of the astigmatic films on the substrate covers an orthographic projection of a corresponding one of the light-emitting chips on the substrate, and a ratio of an area of the orthographic projection of the one of the astigmatic films on the substrate to an area of the orthographic projection of the corresponding one of the light-emitting chips on the substrate ranges from 1 to 2.

10. The backlight module of claim 7, wherein the backlight module further comprises a light-splitting film disposed on a side of the astigmatic films away from the substrate and a brightening film disposed on the light-splitting film.

11. A display device, comprising a backlight module and a display panel disposed on a light-emitting surface of the backlight module, wherein the backlight module comprises:
   a substrate;
   a light source assembly, disposed on the substrate, and comprising a plurality of light-emitting chips disposed at intervals; and
   a light guide plate, disposed on the light source assembly;
   wherein a surface of the light guide plate facing the substrate is provided with a plurality of grooves where one of the light-emitting chips is correspondingly disposed in one of the grooves; a bottom of each of the grooves is provided with a plurality of first concave parts disposed at intervals, and each of the first concave parts is defined with an arc surface recessed towards a direction away from the substrate; a side wall of each of the grooves is provided with a plurality of second concave parts disposed at intervals, and each of the second concave parts is defined with an arc surface recessed towards a direction away from a corresponding one of the light-emitting chips;
   wherein a reflective layer is disposed between the substrate and the light guide plate between adjacent light-emitting chips; a surface of the light guide plate opposite to the reflective layer is provided with a plurality of protrusion parts disposed at intervals, and each of the protrusion parts is defined with an arc surface protruded towards a direction facing the substrate.

12. The display device of claim 11, wherein a distribution density of the first concave parts is greater than a distribution density of the second concave parts.

13. The display device of claim 11, wherein a curvature of the arc surface of each of the first concave parts is greater than a curvature of the arc surface of each of the second concave parts.

14. The display device of claim 11, wherein in an arrangement direction of the plurality of first concave parts, a length of an orthographic projection of each of the first concave parts on the substrate ranges from 5 μm to 50 μm, and a pitch between two adjacent ones of the first concave parts ranges from 5 μm to 500 μm.

* * * * *